(12) United States Patent
Pullara

(10) Patent No.: US 10,474,720 B2
(45) Date of Patent: Nov. 12, 2019

(54) INFORMATION FEED UPDATE MECHANISM

(75) Inventor: Samuel J. Pullara, Los Alto, CA (US)

(73) Assignee: TW SEAGULL ACQUISITION CORP., San Francisco, CA (US)

(*) Notice: Subject to any disclaimer, the term of this patent is extended or adjusted under 35 U.S.C. 154(b) by 0 days.

(21) Appl. No.: 12/957,380

(22) Filed: Nov. 30, 2010

(65) Prior Publication Data

US 2012/0136905 A1    May 31, 2012

(51) Int. Cl.
*G06F 16/904*    (2019.01)

(52) U.S. Cl.
CPC .................. *G06F 16/904* (2019.01)

(58) Field of Classification Search
CPC ........... G06F 17/30994; G06F 21/6263; G06F 17/30286; G06F 17/3056; G06F 16/904; G06Q 50/01
USPC .................................. 707/803, 812
See application file for complete search history.

(56) References Cited

U.S. PATENT DOCUMENTS

| | | | | |
|---|---|---|---|---|
| 7,143,251 | B1* | 11/2006 | Patterson | G06F 17/30153 707/999.201 |
| 2002/0103819 | A1* | 8/2002 | Duvillier et al. | 707/206 |
| 2003/0110186 | A1* | 6/2003 | Markowski | G06F 17/30893 |
| 2006/0173985 | A1* | 8/2006 | Moore | G06F 17/3089 709/223 |
| 2008/0065701 | A1* | 3/2008 | Lindstrom et al. | 707/201 |
| 2009/0070852 | A1* | 3/2009 | Chijiiwa et al. | 726/1 |
| 2010/0161720 | A1* | 6/2010 | Colligan | G06Q 30/02 709/203 |
| 2011/0004831 | A1* | 1/2011 | Steinberg | H04N 21/454 715/753 |
| 2011/0161284 | A1* | 6/2011 | Tewari et al. | 707/609 |
| 2011/0214086 | A1* | 9/2011 | Narayanan et al. | 715/784 |
| 2011/0231478 | A1* | 9/2011 | Wheeler et al. | 709/203 |
| 2012/0066618 | A1* | 3/2012 | Barker | G06F 17/30185 715/753 |
| 2012/0102420 | A1* | 4/2012 | Fukahori | 715/771 |

OTHER PUBLICATIONS

Nicklas Beijar—Networking Laboratory, TKK Helsinki University of Technology, Helsinki, Finland Publication Date Nov. 1, 2007.*
Nicklas Beijar—Index Distribution in a Group-Based Resource Sharing Application—Networking Laboratory, TKK Helsinki University of Technology—Helsinki, Finland—nbeijar@netlab.tkk.fi (Year: 2007).*

(Continued)

*Primary Examiner* — Arpan P. Savla
*Assistant Examiner* — Soheila (Gina) Davanlou
(74) *Attorney, Agent, or Firm* — Fish & Richardson P.C.

(57) ABSTRACT

Techniques and structures relating to processing of data in an information sharing service are disclosed. Implementation of a data structure including entries identifying data that may be shared amongst users in the information service facilitates efficient processing. The data structure entries may include pointers usable to access corresponding details of the sharable data. The entries may also include information useful for filtering the entities, such as an indication of a user account that originates an account update, and a time associated with an update. The data structure may be used to generate data feeds that allow users to access the identified data.

19 Claims, 10 Drawing Sheets

(56) References Cited

OTHER PUBLICATIONS

"What are best practices for building something like a News Feed?" Quora, http://www.quora.com/What-are-best-practices-for-building-something-like-a-News-Feed, 5 pages. [Retrieved Jul. 6, 2011].

Bret Taylor, "How FriendFeed uses MySQL to store schema-less data," Feb. 27, 2009, http://bret.appspot.com/entry/how-friendfeed-uses-mysql, 48 pages. [Retieved Jul. 6, 2011].

Adam Silberstein, Jeff Terrace, Brian F. Cooper, Raghu Ramakrishnan, "Feeding Frenzy: Selectively Materializing Users' Event Feeds," ACM SIGMOD Conference, Jun. 6-11, 2010, 12 pages.

"MyYearbook Social Networking Site Expands Use of eXtremeDB In-Memory Database System," Mcobject: precision data management, Nov. 9, 2010, http://www.mcobject.com/november9/2010, 2 pages. [Retrieved Jul. 6, 2011].

\* cited by examiner

INFORMATION FEED UPDATE MECHANISM

BACKGROUND

This disclosure relates generally to information processing, and, more specifically, to the collection, storage, and distribution of information.

A wide variety of systems such as those hosted on various websites allow users to share information with or establish connections to other users. For example, social media services such as FACEBOOK, TWITTER, MYSPACE, and LINKEDIN provide systems for sharing information between users—for example, by transmitting data between user accounts or providing updates to users regarding other users' activities. As these information sharing services experience growth in both numbers of users and utilization per user, an increased volume of information is shared and provided amongst users. It is common, for example, for users to have hundreds or thousands of "friends" or "connections" via an information sharing service.

Growth in the number of unique user accounts and the volume of data transferred to and from each user account presents scalability challenges for information sharing services.

SUMMARY

Techniques and structures are disclosed that permit the dissemination of information—for example, between users of an information service such as a website, messaging service, or the like. In certain embodiments, the disclosed techniques and structures may provide for efficient processing of data to be shared between users. Information representative of data to be shared may be stored (for example in a data structure or other similar repository) in a manner that allows efficient processing relative to processing the actual data itself. Particular embodiments may use the stored information to generate data feeds that permit users to receive information regarding other users.

In one embodiment, information from user accounts of an information service is received. The received user account information may include details of updates to the user accounts, such as information added by a user, or a change in state of a user account. For example, the received information may indicate that one user has established a "connection" with another user, that a user has added information to a comment field, or that a user has changed his or her profile information (in one embodiment, by uploading a new picture). Many other types of updates are possible. In response to receiving this information, a service may update a data structure to include an entry that is useful for identifying the details of an update. The data structure may be stored separately from the details of the actual update (which may, in some instances, improve a service's ability to provide users with updates about other users' activities by making such operations more scalable). In some embodiments, the data structure may be usable to access corresponding details of updates to the user accounts, but without the data structure including all of the corresponding details of the updates.

In particular embodiments, entries of an update data structure may include pointers that are usable to access corresponding details of updates to user accounts. For example, some embodiments of an update data structure may have entries that respectively include specifications of locations (e.g., Uniform Resource Locators, file system addresses) where further details of user account updates may be accessed. The location specifications may be presented to a user for selection in some embodiments, and in some embodiments the location specifications may be used to automatically access the corresponding details of user account updates without the need for user selection.

Some embodiments filter the update data structure to produce update feeds containing selected entries that correspond to details of one or more updates. The filtering may be based on information included in entries of the update data structure, and performed in response to a request from a particular user. A feed may be generated that includes entries corresponding to details of updates that are of interest to the requesting user. In some embodiments, information included in these feeds may be used to present details of corresponding user account updates to the requesting user. Separate, different feeds may be generated for other users in some cases.

Particular embodiments of the update data structure may have entries that include other information useful for filtering the entities and/or corresponding updates. For example, an indication of a user or user account that originates an account update (e.g., a user ID, a group membership of the user) may be used to select entries that are of interest to other users that wish to receive (e.g., "follow") updates from the originating user, or to receive updates from members of a particular group. As another example, a time associated with an update may be useful for selecting updates based on chronological criteria (e.g., limiting an update feed to a specified number of most recent updates of relevance).

DETAILED DESCRIPTION OF EMBODIMENTS

Figure 1A:
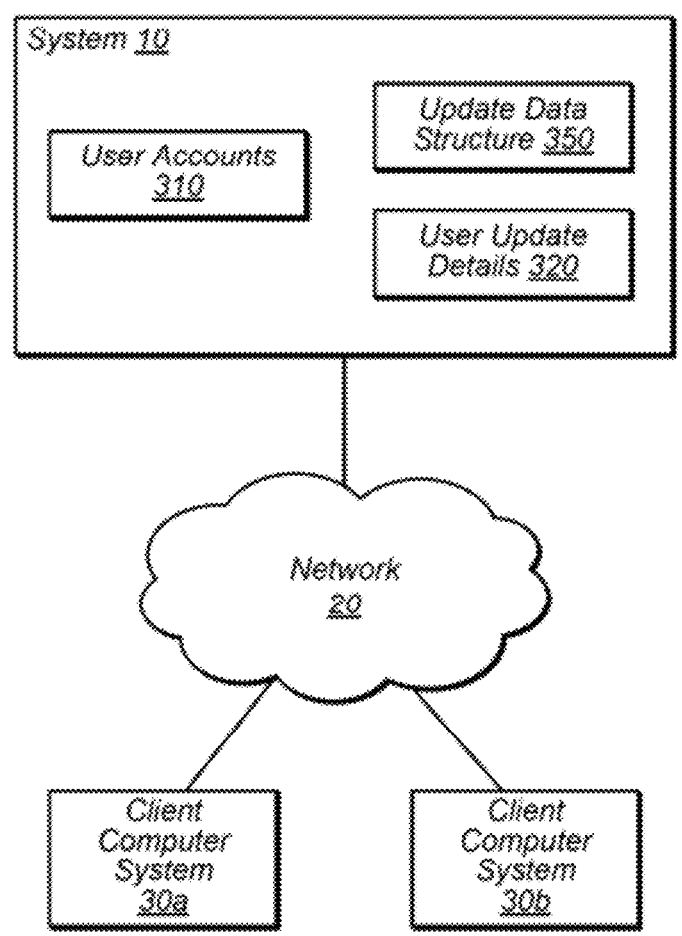
FIG. 1A is a block diagram providing an overview of a system for providing an information feed update.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology: The following paragraphs provide definitions and/or context for terms found in this disclosure (including the appended claims):

"Data Structure." This term refers to an organization of information for use in a computer system, such as, but not limited to, arrays, lists, trees, records, and hash tables.

"Information Sharing Service." This term refers to one or more computer systems that execute software that allows the exchange of information over networks amongst various users of the service under auspices of the service. Some examples may allow sharing of information between any combination of users of the information sharing services, while others may limit sharing between particular users based on various criteria (e.g., subscription level, security level, role). Information may be selectively shared, such that data to be shared with a user is filtered to select only information that is relevant to the particular user. Specific examples of information sharing services are provided below with reference to FIG. 1A.

"User Update." As used herein, this term refers to a notification of a change in a user account of an information sharing service. User updates may include "update details."

"Update Details." This term refers to information characterizing a change in a user account, such as user-entered data added to a field of the user account or an update to the state of the user account. Specific examples of update details are provide below with reference to FIG. 3.

"Update Feed." This term refers to one or more sets of information that may be generated and sent to user accounts of an information sharing service to provide data (e.g., update details) relating to user account updates of one or more information sharing services (e.g., a modification of a user account to add user-entered data, a change in state of a user account) that may be of interest to the user accounts. As explained further below, an update feed differs from a set of email messages in that email messages do not correspond to user account updates.

Information may be shared with various user accounts, and delivered to owners of those user accounts at client computer systems 30c, 30d, and 30e by using update feeds 420c, 420d, and 420e. In some embodiments, user updates may be received from any of the user accounts of the information sharing service. In some cases, update feeds may be sent to any of the user accounts. In other embodiments, user updates or update feeds may be restricted based on criteria associated with the user accounts. For example, a particular user account may receive update feeds relating to users' comments, but may be restricted from receiving update feeds relating to notification of parties viewing the particular user's profile. Such a restriction may be based on, for example, a subscription level (i.e., the amount of money paid to the service by the user on an annual, monthly, or other basis).

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units. An exemplary computer system is described in more detail with reference to FIGS. 1B and 1D.

"Server." This term has its ordinary and accepted meaning in the art, which includes one or more computer systems that are configured to handle requests from client computer systems—e.g., for services, data (including files, web pages, etc.), and so on.

"Client computer system." This term has its ordinary and accepted meaning in the art, which includes a computer system that requests services, data, etc. from a server system.

"Usable by." In the context of element X is "usable by" computer system Y to do Z, this phrase refers to a situation in which computer system Y is configured to perform function Z using (e.g., reading, manipulating, executing) element X. Thus, if a computer system is configured to generate data by performing various operations, including selecting information from a data structure, it can be said that the data structure is "usable by" the computer system to generate data. Similarly, if a computer system is configured to manipulate a data structure to add or modify data such that set of information is stored in the data structure, it can be said that the data structure is "usable by" the computer system to store the set of information.

"First," "Second," etc. As used herein, these terms are used as labels for nouns that they precede, and do not imply any type of ordering (e.g., spatial, temporal, logical, etc.). For example, a computer system generating "first" and "second" update feeds does not require that the "first" update feed be generated prior to the "second" update feed.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Comprising" This term is open-ended. As used in the appended claims, this term does not foreclose additional structure or steps. Consider a claim that recites: "A system, comprising one or more servers . . . ." Such a claim does not foreclose the apparatus from including additional components (e.g., a network interface, storage subsystem). "Including" and "having" are similarly used terms that are also open-ended.

"Configured To." As used herein, this term means that a particular piece of hardware or software is arranged to perform a particular task or tasks when operated. Thus, a computer system that is "configured to" perform task A means that the computer system includes a circuit, program instructions stored in memory, or other structure that, during operation of the computer system, performs or can be used to perform task A. (As such, a computer system can be "configured to" perform task A even if the computer system is not currently on.) Similarly, a computer program that is "configured to" perform task B includes instructions, that if executed by a computer system, perform task B.

"Coupled." As used herein, this term means that various elements are connected, although not necessarily directly, and not necessarily mechanically. For example, consider computer system A wirelessly communicating with computer system B via an intermediate device. Computer system A can be said to be coupled to computer system B (and vice versa).

Turning now to FIG. 1A, an overview of an implementation of one embodiment of an information feed update system is depicted. As shown, system 10 may store and manage information relating to user accounts 310, update data structures 350, and update details 320. As will be described below, system 10 may process data in an information sharing service to facilitate dissemination of information between users having, for example, user accounts 310. The information sharing service may be any computer-implemented service that facilitates sharing of information amongst various users of the service. Examples of information sharing services include social media services and online communities (e.g., FACEBOOK, TWITTER, MYSPACE, LINKEDIN, FLICKR, DELICIOUS), virtual worlds (e.g., SECOND LIFE, multi-user dungeons, massively multiplayer online role-playing games) and electronic mailing list-type applications (e.g., LISTSERV, YAHOO! GROUPS, GOOGLE GROUPS). Users may access user accounts 310 of the information sharing service from client computer systems 30 via network 20 to designate information to be shared with other users, and to receive relevant information that other users of the information sharing service have designated for sharing.

System 10 is any type of computer system that can perform operations associated with an information sharing service and process requests from a client computer system. System 10 may include one or more server systems in any suitable type of arrangement. System 10 may be a server farm. System 10 may store program instructions executable to perform operations associated with information sharing service, including managing data received from client computer systems 30, sending data to client computer systems 30 via one or more predetermined protocols, and servicing requests received from client computer systems 30. For example, system 10 may include a web server accessible at a predetermined location (e.g., specified by a URL), and include program instructions executable to service requests for web pages via an Internet protocol such as HTTP. Representative structures of system 10 are described further below with reference to FIGS. 1B and 1D.

Network 20 is any suitable type of connection between system 10 and client computer systems 30a and 30b. In some embodiments, network 20 may be a public network. Particular embodiments include network 20 as being the Internet, permitting client computer systems 30 to access locations on the World Wide Web (WWW), including, in certain embodiments, server system 10. In some embodiments, network 20 may include a local-area network, a wide-area network, or combinations thereof. Network 20 can also represent two or more disparate networks coupled together. Network 20 can be wireless or have wireless components in various embodiments. In some embodiments, network 20 includes at least a portion that is a public network (e.g., not closed or proprietary). Examples of public networks include portions of the Internet backbone, the World Wide Web, mobile phone networks, the PSTN, WiFi hotspots, and the like.

Client computer systems 30 (two of which are depicted as 30a and 30b) are any suitable type of computing device storing program instructions executable to connect to a server (e.g., system 10) over a network (e.g., network 20). For example, client computer systems 30 may store program instructions that are executable to implement a browser program for displaying web pages (e.g., those hosted by system 10) and accessing an information sharing service. As will be described below, a user of client computer systems 30a may use a browser to access a corresponding account of user account 310 of an information sharing service to designate information to be shared with other users, and to receive relevant information that other users of the information sharing service have designated for sharing. (Note that systems 30a and 30b need not be related to one another in any way and can be geographically disparate. Additionally, systems 30a and 30b can have different architectures.) Systems 30 can be computers (e.g., laptops, desktops, netbooks, etc.), mobile telephones, or other similar device.

Figure 1B:
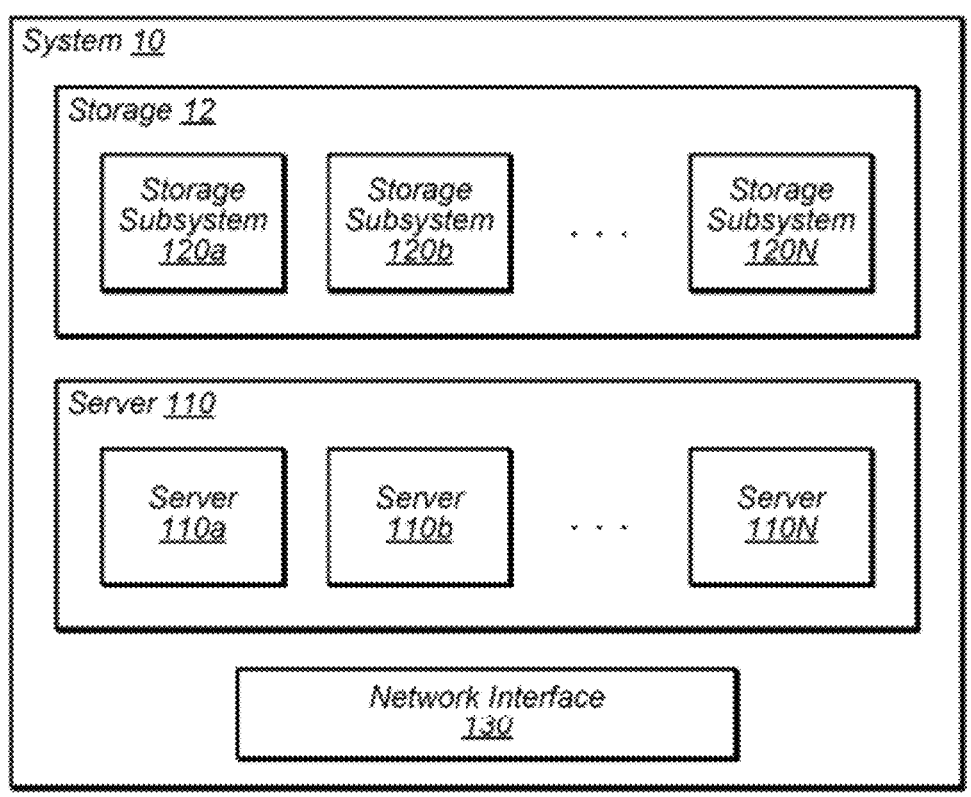
FIG. 1B is a block diagram of one embodiment of the system depicted in FIG. 1A.

Turning now to FIG. 1B, a block diagram of one embodiment of system 10 is depicted. As shown, system 10 includes storage 12 and network interface 130 that are coupled to server 110. Server 110 may be one or more servers that are configured to singly or collectively provide functionality of the information sharing services. In some embodiments, network interface 130 may be part of a web server dedicated to processing network communications between client computer systems 30 and servers 110, such as a selection from a client computer system 30 designating information from a user account to be shared with other users. In some other embodiments, network interface 130 may be a part of a single server 110 that is configured to provide functionality of an information sharing service.

Figure 1C:
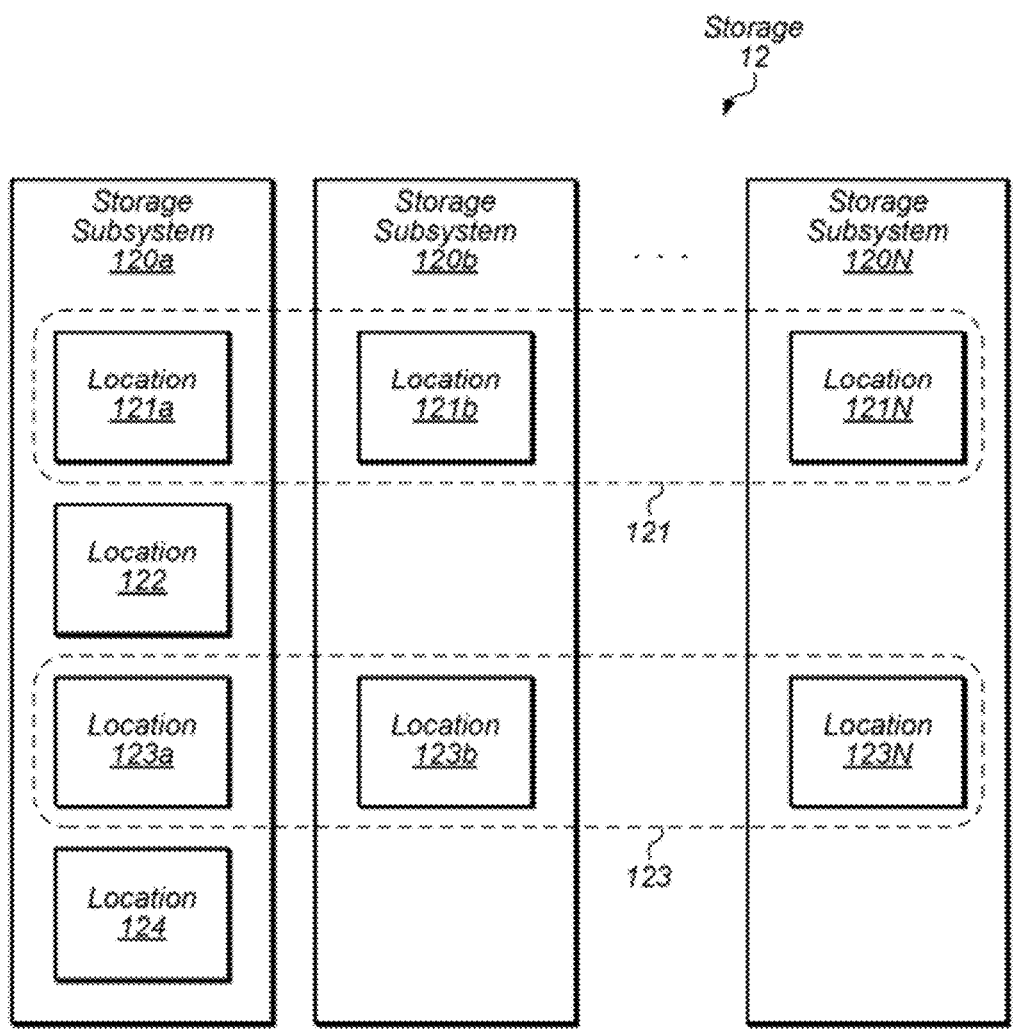
FIG. 1C is a block diagram of an embodiment of a representative storage system.

Storage 12 may in some embodiments include one or more storage subsystems. For example, storage 12 may include one or more disk drives coupled to one or more server 110. In other embodiments, storage 12 may include a plurality of storage systems configured as a storage area network, network attached storage, or any suitable storage subsystem configuration. In some embodiments, storage 12 may be remote from server 110. Storage 12 may in some cases be a virtual storage subsystem, accessed, for example, though a cloud computing provider. Referring also to FIG. 1C, an embodiment of storage 12 that includes multiple storage subsystem 120 may store data in locations within a single storage subsystem (e.g., location 122 or location 124), or as data stored in a distributed manner (e.g., a distributed database) across several storage subsystems (e.g., location 121 or location 123).

Figure 1D:
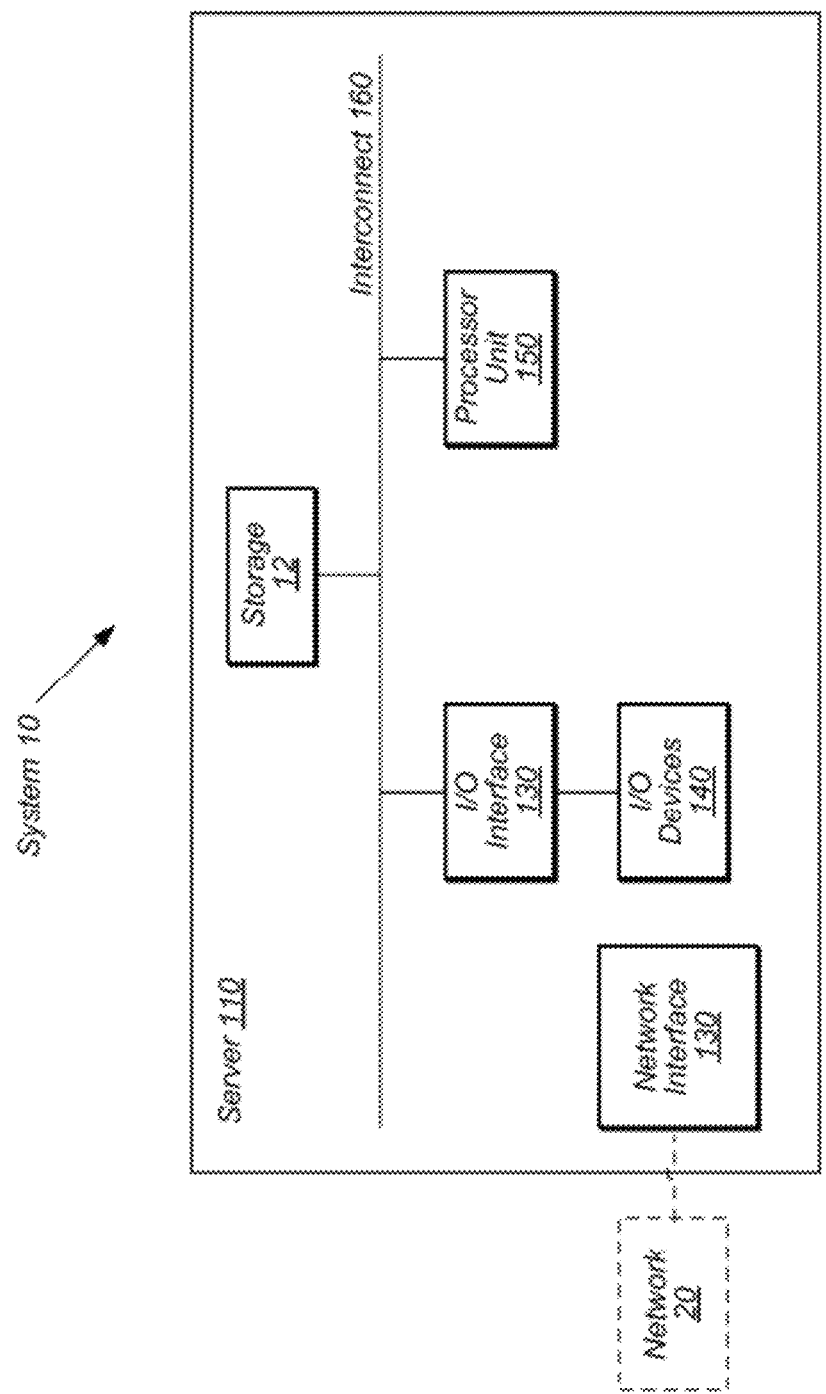
FIG. 1D is a block diagram of one embodiment of the system depicted in FIG. 1A.

Turning now to FIG. 1D, a block diagram of one embodiment of server 110 is depicted. Server 110 is representative of a plurality of servers in an embodiment of system 10, as well as a single system 10 in an embodiment of system 10 that includes only one server. System 10 may be any suitable type of device, including, but not limited to, a personal computer system, desktop computer, laptop or notebook computer, mainframe computer system, web server, workstation, or network computer. As shown, computer system 100 includes a processor unit 150, storage 120, input/output (I/O) interface 130 coupled via an interconnect 160 (e.g., a system bus). I/O interface 130 may be coupled to one or more I/O devices 140.

As described above, processor unit 150 includes one or more processors. In some embodiments, processor unit 150 includes one or more coprocessor units. In some embodiments, multiple instances of processor unit 150 may be coupled to interconnect 160. Processor unit 150 (or each processor within 150) may contain a cache or other form of on-board memory. In general, computer system 100 is not limited to any particular type of processor unit or processor subsystem.

Storage subsystem 120 is usable by processor unit 150 (e.g., to store instructions executable by and data used by unit 150). Storage subsystem 120 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 120 may consist solely of volatile memory in one embodiment. Storage subsystem 120 may store program instructions executable by server 110 using processor unit 150, including program instructions executable to cause server 110 to implement the various techniques disclosed herein.

I/O interface 130 may represent one or more interfaces and may be any of various types of interfaces configured to couple to and communicate with other devices, according to various embodiments. In one embodiment, I/O interface 130 is a bridge chip from a front-side to one or more back-side buses. I/O interface 130 may be coupled to one or more I/O devices 140 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Figure 2:
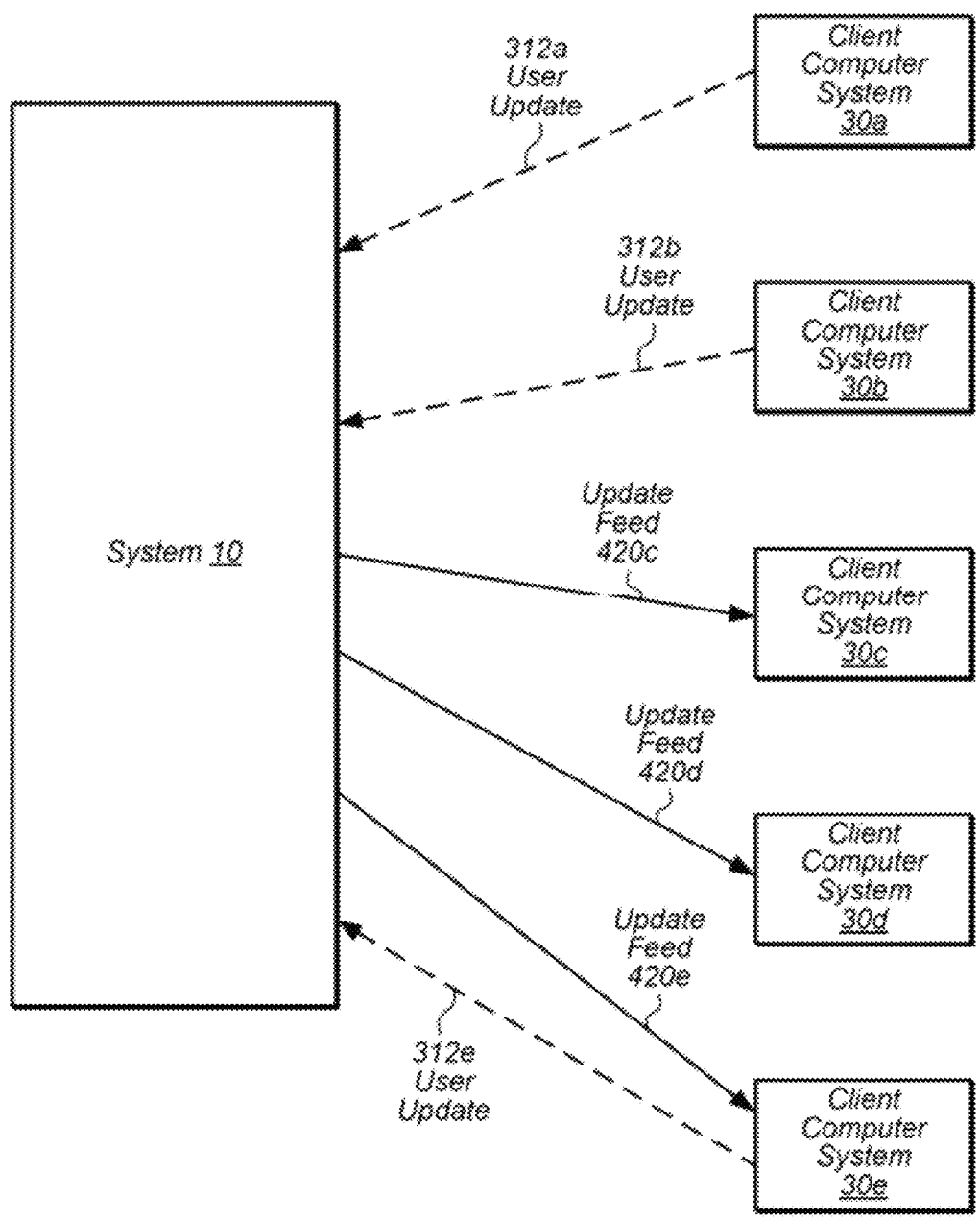
FIG. 2 is a block diagram depicting one of embodiment of a system receiving user updates from various user accounts and sending update feeds to various user accounts.

Turning now to FIG. 2, a block diagram is shown that depicts interactions between one embodiment of system 10 and various client computer systems 30 of users of the information sharing service. System 10, performing operations of an information sharing service, may receive user updates 312a, 312b, and 312e from users accessing respective user accounts of the information sharing service using client computer systems 30a, 30b, and 30c. As will be discussed in detail below, system 10 performs various operations that allow sharing of all or some of the details of updates 312a, 312b, and/or 312e amongst various users of the information sharing service that may be interested in the updates. Information may be shared with various user accounts, and delivered to owners of those user accounts at client computer systems 30c, 30d, and 30e by using update feeds 420c, 420d, and 420e. In some embodiments, user updates may be received from any of the user accounts of the information sharing service. In some cases, update feeds may be sent to any of the user accounts. In other embodiments, user updates or update feeds may be restricted based on criteria associated with the user accounts. For example, a particular user account may receive update feeds relating to users' comments, but may be restricted from receiving update feeds relating to notification of parties viewing the particular user's profile. Such a restriction may be based on, for example, a subscription level (i.e., the amount of money paid to the service by the user on an annual, monthly, or other basis).

Figure 3:
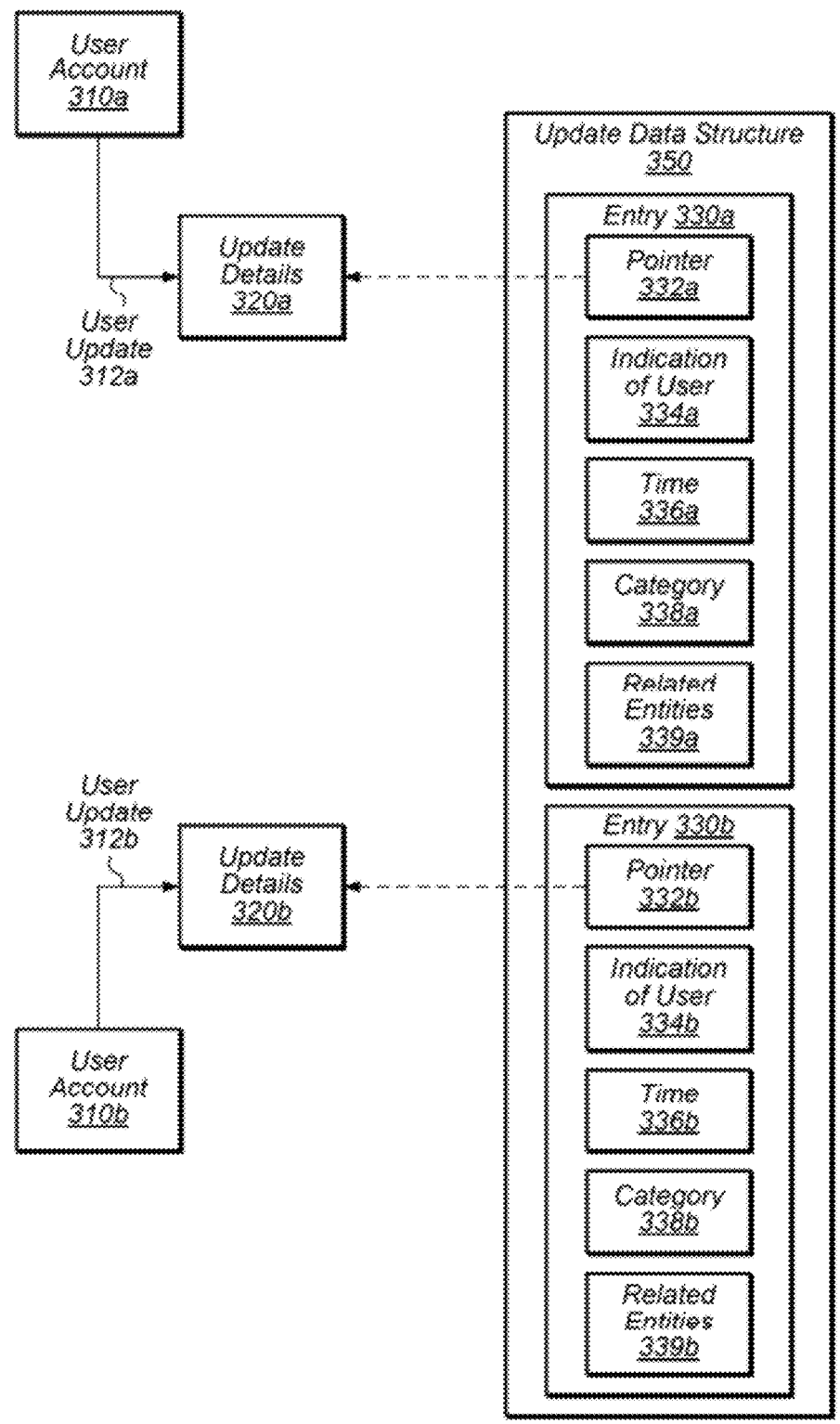
FIG. 3 depicts user updates originating from various sources, and an embodiment of an update data structure including entries corresponding to user update details associated with the user updates.

FIG. 3 further depicts one embodiment of system 10 performing operations relating to receiving user updates associated with user accounts of an information sharing service. As shown, system 10 may receive user updates from various user accounts, including user update 312a from user account 310a and user update 312b from user account 310b. User updates 312 may include update details 320 relating to various user-entered information or to a change in state of the user accounts. For example, update details 320 may indicate that one user has established, or requested to establish, a "connection" with another user; that a user has added information to a comment field in that user's account, or in a different user's account; or that a user has changed his or her profile information (e.g., uploading a new picture).

User update 312 and the included update details 320 may be in some cases relate to a user account of a person (e.g., person A has posted a comment on person B's account), and in some cases may relate to a user account of a group (e.g., organization A has posted an announcement or an updated membership list). In some embodiments, update details 320 are stored by system 10.

A data object such as update data structure 350 may be implemented using system 10 to facilitate processing of data related to update details 320, for example to filter the data structure (i.e., sort through to select certain appropriate entries of the data structure) to identify information to be shared with various users. Update data structure 350 may be any type of data structure that is suitable for efficient processing of information included therein. For example, various embodiments of system 10 may utilize update data structure 350 that are arrays, lists, trees, records, hash tables, or other data structures. Optimizations such as Bloom filters may be implemented to improve efficiency in certain embodiments.

Referring to FIG. 1C, in certain embodiments of system 10, update details 320 may be stored in storage 12 in a location within a single storage subsystem (e.g., location 122) or in a distributed manner across more than one storage subsystem (e.g., location 121). Similarly, update data structure 350 may be stored in storage 12 in a location within a single storage subsystem (e.g., location 124) or in a distributed manner across more than one storage subsystem (e.g., location 123)

Returning now to FIG. 3, entries 330 of update data structure 350 include sufficient data to enable system 10 to filter update data structure 350 to select entries of relevance to a particular user account. In the depicted embodiment, update data structure 350 includes entry 330a that corresponds to update details 320a, and entry 330b that corresponds to update details 320b. An entry 330 may include various types of data usable by system 10 for filtering to select entries that are of interest to a particular user account. For example, FIG. 3 depicts indication of user 334, associated time 336, category 338, and related entities 339 as being included in entry 330.

Indication of user 334 may be used during filtering operations to select entries that are of interest to other users wishing to receive (e.g., "follow") updates from the indicated user. As one example, indication of user 334 may indicate person A that originated the update, and system 10 may select that entry when filtering for entries of relevance to a user account that has specified an interest in following updates, activity, or information from person A.

Associated time 336 may be used during filtering steps to select updates based on chronological criteria. For example, some embodiments may allow a user to configure the specific number of most recent relevant updates that a user is interested in viewing. In this example, a user might specify that only the twenty most recent updates are to be presented. System 10 may filter update data structure 350 based on associated time 336, starting from the most recent entry 330 of update data structure 350. Because only the twenty most recent updates for the user are desired, the filtering operations could cease after twenty entries 330 of relevance to the user are identified.

Associated time 336 may also be utilized to specify an effective associated date for an entry 330 that is in the future. In such a case, system 10 may exclude an entry 330 based on an associated time 336 not yet occurring. An entry 330 having an associated date in the future may be useful for updates such as securities-related announcements, changes in job status, and birthday reminders that preferably are not publicly visible prior to a specific date.

Category 338 may be used during the filtering operations to exclude types of updates that are not of interest to a particular user. For example, categories of updates might include new comments, connection requests, profile updates, likes, bag creation, and addition of items to bags. A particular user A might be interested in receiving updates relating to new comments and profile updates for user B's account, but choose not to receive updates relating to connection requests for user B. In this case, category 338 could be used to exclude connection request entries for user B that might otherwise have been identified as being of interest to user A (e.g., based on user A following user B).

Related entities 339 may specify, for example, entities other than the originator of a user update that may be interested in the particular user update. For example, an entry corresponding to user A's request to "connect" with user B may specify user B as a related entity 339 and specify user A in an indication of user 334. Filtering for updates of interest to user B may identify the particular user update based on related entities 339, regardless of whether user B has indicated an interest in receiving updates from user A.

Particular embodiments of update data structure 350 may include entry 330 having fields similar to those discussed above, without including the detailed data of the corresponding update details 320. The detailed data of update details 320, which for example may include data representing user comments or user account profile updates, may require significantly greater storage space than what is required for entry 330. Thus, manipulation of data included in entry 330 of update data structure 350 may be performed with significantly improved efficiency as compared to manipulation of the data of corresponding update details 320.

Entry 330 may also include pointer 332 that is usable to access update details 320. Some embodiments include pointer 332 specifying locations (e.g., Uniform Resource Locators, file system addresses) where corresponding update details 320 may be accessed. In some embodiments, the location specifications may be used to automatically access corresponding update details 320 without the need for user selection. In some embodiments, the location specifications may be presented to a user for selection. Thus, update data structure 350 may provide data in the form of entries 330 that can be efficiently processed by system 10 to identify various update details 320 of interest, and to access the identified update details.

Additional optimizations may be realized in some embodiments of system 10 through various techniques for adding entries 330 to update data structure 350. In some cases, a new entry 330 may be added to update data structure 350 asynchronously, such as in response to receiving user update 312. This may optimize that response to a request for an update feed. In other cases, multiple new entries 330 may be added to update data structure 350 synchronously, such as in response to an update event. For example, updates may be queued and released for addition to update data structure 350 (e.g., as part of a batch process for maintaining update data structure 350) only when a user requests an update feed from update data structure 350. In such a case, all queued new entries 330 would be added to update data structure 350 prior to filtering update data structure 350 to produce the requested update feed. Synchronous updating of update data structure 350 may result in more efficient processing, and reduced network traffic.

Figure 4:
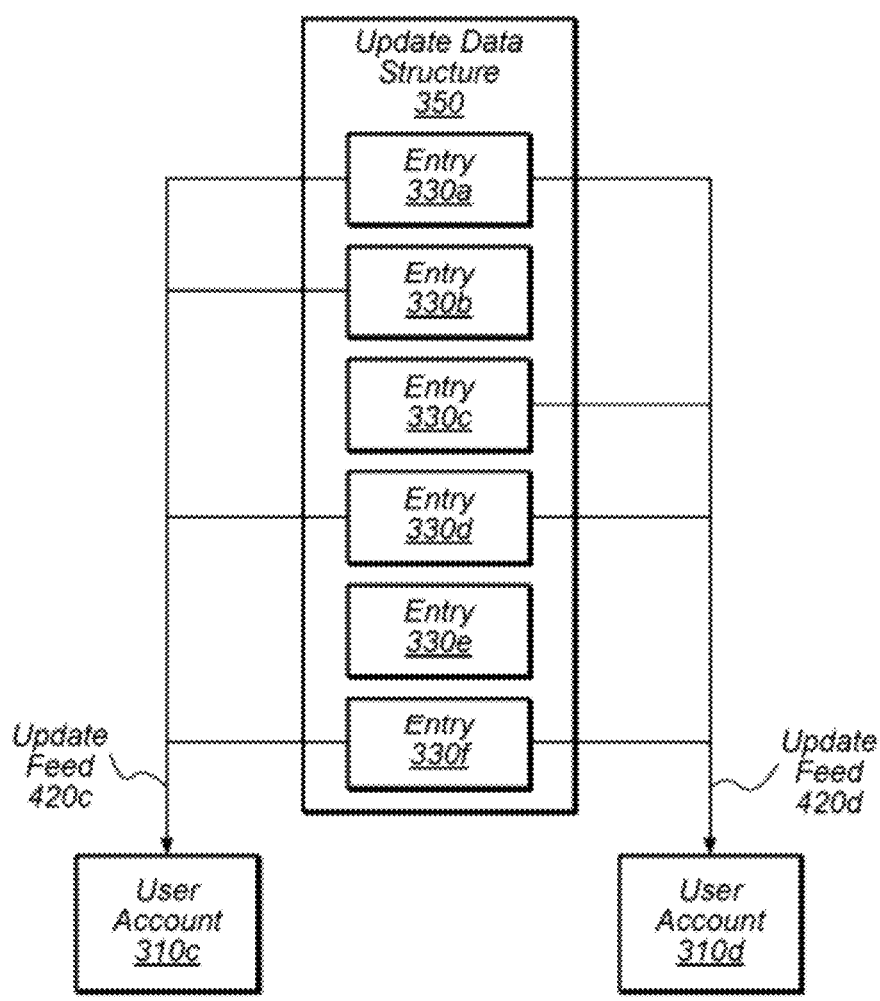
FIG. 4 depicts generation of various update feeds based on entries of an update data structure, according to an embodiment.

As discussed above, entries 330 of update data structure 350 include sufficient data to enable system 10 to filter update data structure 350 and select entries of relevance to a particular user account. For example, FIG. 3 depicts an embodiment in which indication of user 334, associated time 336, category 338, and related entities 339 may be used to select entries relevant to a particular user account. Turning now to FIG. 4, generation of update feeds 420 for user accounts 310 is depicted. Filtering of update data structure 350 may be employed to select entries 330 that are of interest to user account 310*c*. The selected entries may be sent to user account 310*c* in the form of update feed 420*c*.

As discussed above, each of the selected entries 330 in update feed 420*c* may include a pointer to corresponding update details 320. Thus, update feed 420*c* may be usable to cause corresponding update details 320 to be displayed to an owner of user account 310*c* (e.g., using a client computer system accessing user account 310*c*).

Individual update feeds 420 can be generated for various user accounts 310 that will receive the generated feeds ("recipient accounts"). For example, update feed 420*c* is depicted as being generated for user account 310*c*, and includes selected entries 330*a*, 330*b*, 330*d*, and 330*f* that have been identified as being of interest to user account 310*c*. The depicted example also shows update feed 420*d* as being generated for user account 310*d*, and includes selected entry 330*a*, 330*c*, 330*d*, and 330*f* that have been identified as being of interest to user account 310*d*. In some embodiments, generation of update feeds 420 may be automatically performed for each user account 310 in response to a user logging in to the user account, or in response to a user performing a request for an update feed by some other means (e.g., a menu selection).

In some embodiments, multiple update feeds may be performed in combination in order to minimize the frequency at which the update data structure 350 must be filtered. In these embodiments, a shared filtering of update data structure 350 may be performed based on a combination of data from corresponding user accounts. Such techniques result in less frequent, but more computational intensive filtering operations to be performed on update data structure 350. For example, a shared filtering may be performed in which update data structure 350 is filtered once based on a combination of data corresponding to user accounts A, B, and C. In some cases, the shared filtering may produce an intermediate set of data containing entries that are each relevant to one or more of user accounts A, B, and C. This smaller intermediate set of data can then be filtered specifically for each of user accounts A, B, and C to generate three distinct update feeds. In other cases, the shared filtering of update data structure 350 may produce distinct update feeds for each of user accounts A, B, and C without use of the intermediate set of data.

Further improvements provided by system 10 can be appreciated in view of FIGS. 2-4. For example, in addition to the above-discussed efficient processing enabled by the smaller quantity of data included in entry 330 than in the corresponding update details 320, further efficiency is gained because update data structure 350 may include, in a single data structure, entries 330 corresponding to all user updates in an information sharing service. Thus, entry of a user update in a user account of the information sharing service (e.g., storage of update details 320 by system 10) may result update data structure 350 being modified to add an entry 330 that corresponds to the user update. As discussed above, and in additional detail below, various filtering operations may be performed on update data structure 350 in order to select information that is of interest to other users.

In contrast, prior systems may copy and send user update information to a plurality of related user accounts without affording an opportunity to perform filtering operations that could potentially reduce the amount of transferred data. For illustrative purposes, consider a scenario in which an information sharing service receives a user update—including information such as a comment, message, post, etc. (e.g., update details)—from a particular user having 100 followers. Present implementations of information sharing services may immediately forward copies of the user update information to user accounts of each of the 100 followers (requiring 100 write operations involving the user update information). In one example, one of the followers (follower A) may have specified that only the twenty most-recently received comments, etc. are to be displayed. However, because the information was immediately forwarded at a time when follower A may not be logged on to the information sharing service, it is possible that the forwarded information will not be seen by follower A (e.g., more than twenty newer additional comments may be received by follower A's account prior to follower A logging on). Thus, the forwarding of the comment to follower A may represent an entirely extraneous transmission that provides no value to follower A. Embodiments of system 10 may present an improvement by providing filtering, such as the above-discussed chronological-based filtering, that may prevent the extraneous transmission. In this example, the particular embodiment of system 10 may also reduce the number of required write operations involving the user update information from 100 (e.g., the number of followers) to a potentially much smaller number (e.g., a filtered group of followers).

Another potential improvement afforded by some embodiments of system 10 is illustrated by considering a similar scenario in which a user update is received from a particular user (user A) having 100 followers. As noted above, some implementations of present information sharing services may perform 100 write operations to initially forward copies of user update information to accounts of each of the 100 followers. In contrast, particular embodiments of system 10 may provide update feeds having user-selectable pointers to the user update information. These particular embodiments may require only one write operation for the user update information to initially store the update details (e.g., in a location associated with the user A's account), and one write operation to add a reference having the user selectable pointer to an update data structure. In some embodiments, when a follower (follower B) that receives the user-selectable pointer chooses to access the corresponding user update information (e.g., by selecting a hyperlink associated with a reference label describing, for example, that "User A has added a comment to bag X" or "User A has updated bag Y"), the pointer may be used to cause a write operation that provides the user update information stored in user A's account to be provided to follower B's account. In this way, the number of write operations for the user update information initially required to make the information available to user A's followers may be reduced from a quantity equaling the number of followers (e.g., 100 in this example) to 1 (e.g., the initial storage of the user update information in user A's account). In this example, delivery of the user update information to follower B's account may require one additional write operation for the user update information. Furthermore, caching may be employed in some embodiments to provide additional optimizations for sending the user update information to other followers.

Furthermore, consider a present system in which a user accessing an account of a social networking service may cause querying of many accounts to collect relevant user updates. For example, user account A may "follow" or be "connected" to 100 other user accounts, with twenty of those accounts currently having user updates of interest for user account A. In prior systems, the 100 other user accounts may all be accessed in order to determine the twenty user updates of interest. The 80 accessed user accounts that do not contain updates of interest represent extraneous, unneeded operations and network traffic.

In contrast, the same scenario as applied to an embodiment of the present disclosure includes system 10 initially accessing update data structure 350 to determine twenty entries 330 corresponding to twenty update details 320 of interest. System 10 may then use pointers 332 included in entries 330 to access the twenty update details 320 of interest in the various user accounts. Thus, instead of querying 100 separate user accounts to collect twenty user updates of interest, one update data structure 350 (an "uberfeed") that includes user updates from all user accounts of the information sharing service may be queried to identify the twenty user updates of interest, and twenty user accounts are queried to collect the twenty user updates of interest.

Figure 5:
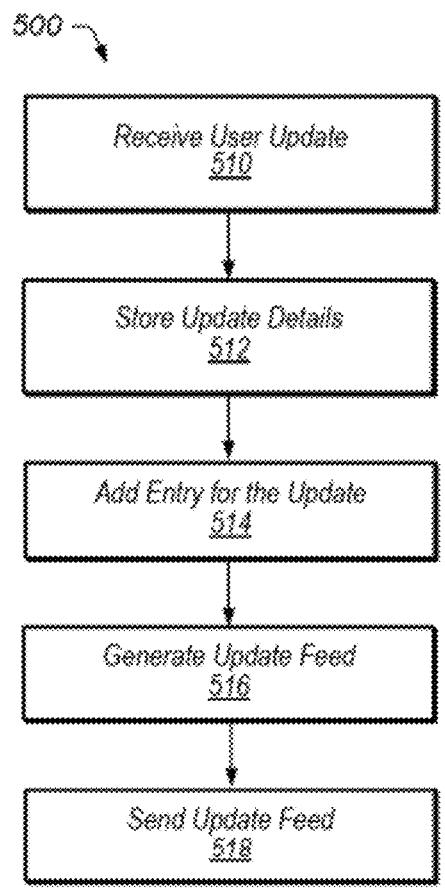
FIG. 5 is a flowchart illustrating operation of one embodiment of an information feed update system.

Turning now to FIG. 5, a flowchart of method 500 that may be performed by system 10 is depicted. In step 510, a computer system receives a user update associated with a first of a plurality of user accounts of an information service. In this context, "associated with" denotes that the received user update is related to, refers to, or corresponds to a first of a plurality of user accounts. The user update may include update details relating to various content added by a user, or various changes in state of the first user account.

Figure 6A:
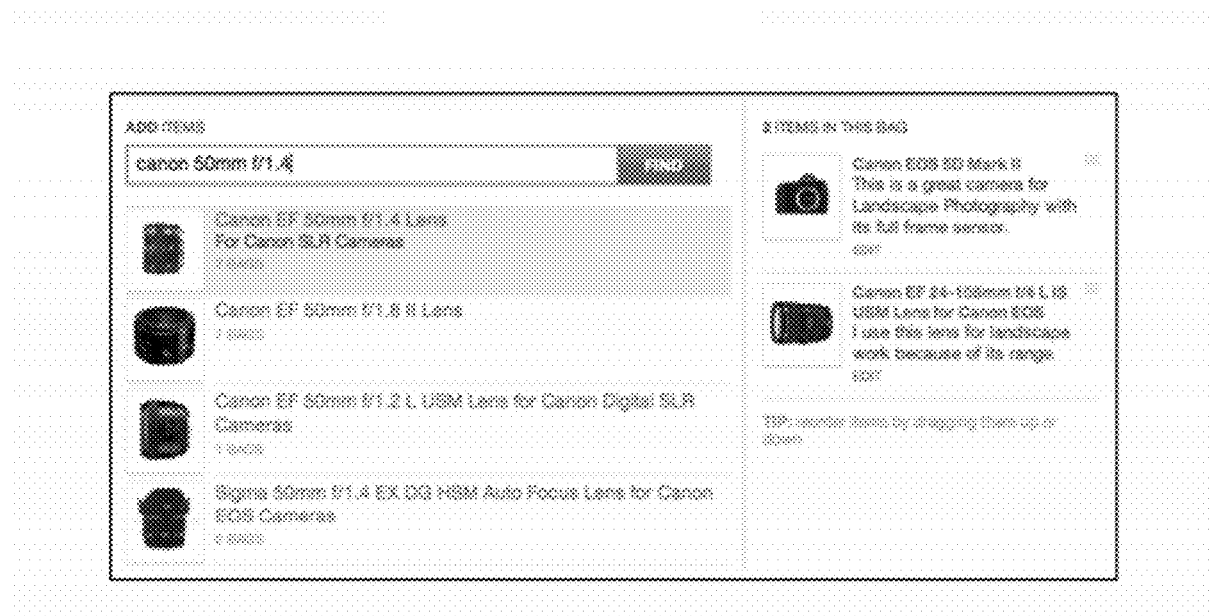
FIGS. 6A and 6B are screen captures illustrating use of a browser to enter update details, according to one embodiment.
Figure 6B:
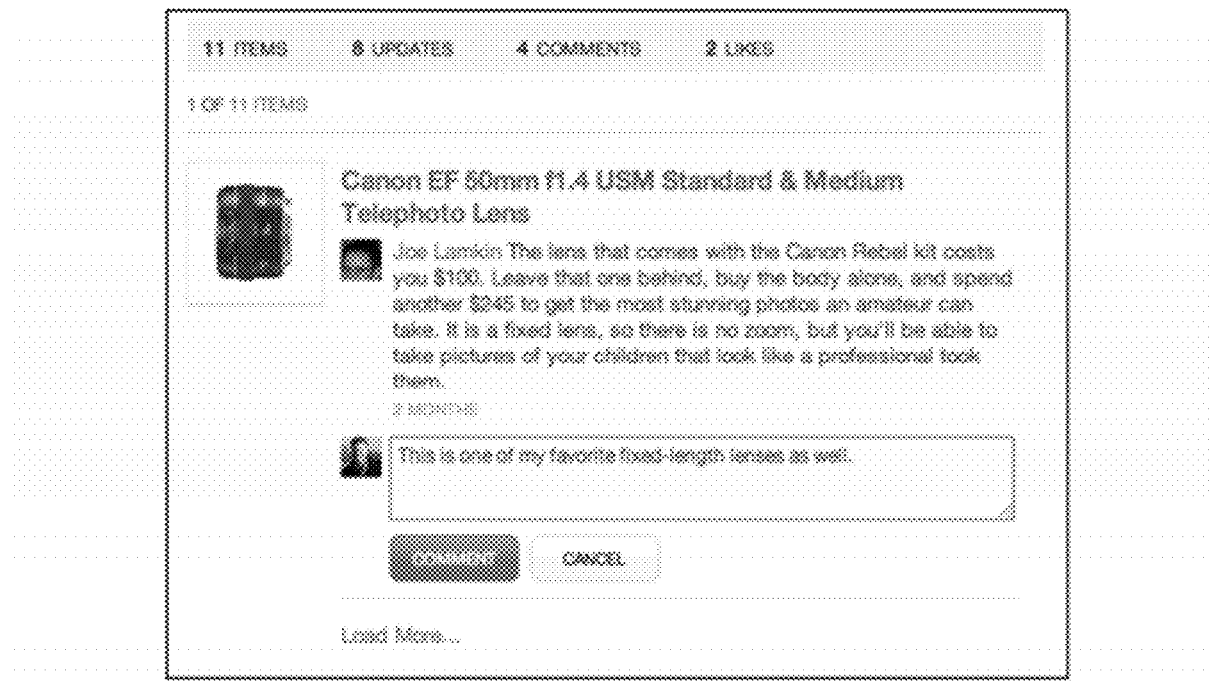

FIGS. 6A and 6B show screen captures from one embodiment of an information sharing service that permits users to follow, for example, lists of products specified by other users of the service. These Figures depict use of a browser to enter update details. FIG. 6A illustrates an item (CANON 50 mm EF f/1.4 Lens) being added to a "bag" (e.g., a group of items) that may be, for example, followed or commented on by users of the information sharing service. Addition of this item to a bag results in followers of the particular bag being provided with update feeds indicating the addition of the new item.

FIG. 6B illustrates a follower of a bag commenting on an item within the bag. Followers of the bag will be provided with update feeds indicating this update, in which the added comments constitute update details Returning to FIG. 5, in step 512, the computer system stores the update details in a location associated with the first user account. In this context, "associated with" denotes that the location stores information corresponding to the first user account. The location may be within a single storage subsystem, or the computer system may store the update details in a distributed manner using a plurality of storage subsystems.

In step 514, the computer system adds an entry for the user update to an update data structure. The entry includes a reference to the stored update details, but not the details themselves. The update data structure may include at least one other entry that includes a reference to update details corresponding to a user update from a different user account. In some embodiments, the reference to the stored update details includes an indication of the user and a pointer to the update details, without including the content of the update details. In some embodiments, the entry includes an effective time value. In some embodiments, the computer system adds the entry for the user update asynchronously in response to storing the update details. In some embodiments, the computer system adds the entry for the user update synchronously as part of a batch process. The update data structure may be stored within a single storage subsystem, or the computer system may store the update data structure in a distributed manner using a plurality of storage subsystems.

Figure 7:
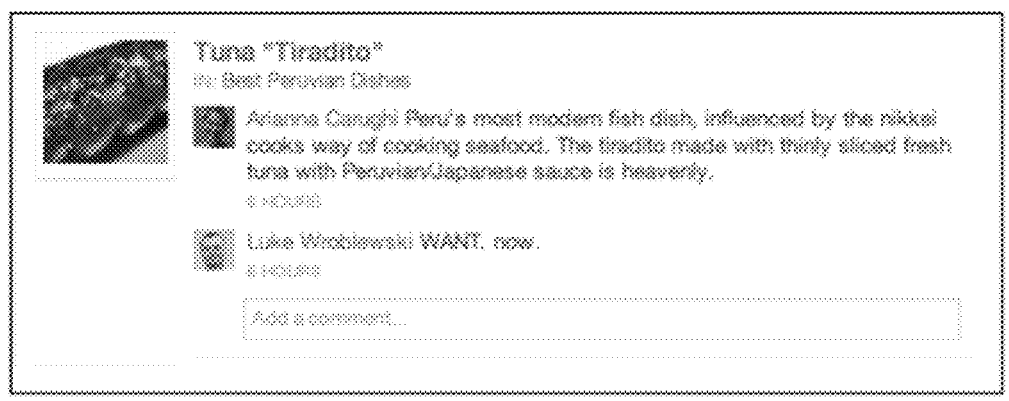
FIG. 7 is a screen capture illustrating a browser presenting information generated by using an update feed, according to one embodiment.

In step 516, the computer system generates an update feed for one or more of the plurality of user accounts using the update data structure. The update feed may provide information relating user account updates that may be of interest to the user accounts receiving the update feed. The update feed may provide information relating to user account updates from a plurality of user accounts. Step 516 may include the above-discussed filtering to select entries of interest for a particular user account. In some embodiments, the update feeds are generated by performing a shared filtering based on information associated with two or more user accounts. In some embodiments, a pre-specified number is used in generating the update feeds, such that a certain number of most-recent entries for a user account are included in the update feed. In some of these embodiments, the pre-specified number is received as an input. (The number is said to be "pre-specified" by virtue of the number having been set, at least temporarily, prior to generating the update feed. For example, the number, which may be represented by the value N, may be a default of the information service, or may explicitly specified by a user.) FIG. 7 is a screen capture illustrating a browser presenting information generated by using an update feed, including comments added by other users. Comments, constituting update details, from two users are shown.

Update feeds may include update details that are determined to be of interest to recipients of the update feeds. As noted above, update details include information characterizing a change in a user account, such as user-entered data added to a field of the user account or an update to the state of the user account. In many instances, update feeds include a plurality of update details that characterize changes in a plurality of user account.

While the term "update feed" is intended to be broad, it does not refer, for a number of reasons, to a set of information corresponding to a user's email inbox that permits receipt of email from any given email address. An update feed, unlike an email inbox set to receive email from any arbitrary email address, is generated based on updates made within one or more specified information sharing services. For example, in one embodiment, an update feed for a user account of a social media website is limited to changes made within that website (and, in particular, to other user accounts of interest to the account to which the update feed is generated). In another embodiment, an update feed may be generated based on updates from two more different information sharing services, thus providing an aggregated update feed from different services. Additionally, an email inbox such as that described above, is not generated based on user account updates.

In some updates, an update feed for a particular user account may be limited in the number of included updates, either based on a parameter of the service, a setting made by the user, or a combination thereof. Thus, in some instances (e.g., when a user does not access his or her account for a long period of time), the generated update feed might include information corresponding to only the most recent updates (e.g., the last 100 updates). In some embodiments, an update feed may be generated by a service based on a user specifying a relationship with one or more other users and without explicitly requesting updates about those other users or setting parameters that define the update feed. Thus, as but one example, a social media website may "automatically" generate an update feed for a user account based on "relationships" set for that user. In another embodiment (e.g., a messaging service), an update feed may be generated based on a user account explicitly requesting updates from other user accounts (e.g., one user requesting to "follow" updates provided by another user of the messaging service).

Articles of manufacture that store instructions (and, optionally, data) executable by a computer system to implement various techniques disclosed herein are also contemplated. These articles of manufacture include tangible computer-readable memory media. The contemplated tangible computer-readable memory media include portions of a memory subsystem of server 110 (without limitation SDRAM, DDR SDRAM, RDRAM, SRAM, flash memory, and various types of ROM, etc.), as well as storage media or memory media such as magnetic (e.g., disk) or optical media (e.g., CD, DVD, and related technologies, etc.). The tangible computer-readable memory media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:

receiving, by a computer system, a first set of updates posted to a first user account on a social network, the first set of updates including a first set of update details, the first set of update details comprising contents posted to the social network by a first user associated with the first user account;

the computer system storing, for the first set of updates, the first set of update details in a location associated with the first user account;

the computer system adding a first entry for the first set of updates to an update data structure, wherein the first entry includes a reference to the location where the first set of update details is stored, and includes one or more data parameters related to the first set of update details but does not include the first set of update details, wherein the one or more data parameters related to the update details provides information to selectively filter the update data structure;

receiving, by the computer system, a second set of updates posted to a second user account, the second set of updates including a second set of update details, the second set of update details comprising contents posted to the social network by a second user associated with the second user account;

the computer system storing, for the second set of updates, the second set of update details in a location associated with the second user account;

the computer system adding a second entry for the second set of updates to the update data structure, wherein the second entry includes a reference to the location where the second set of update details is stored, and includes one or more data parameters related to the second set of update details but does not include the second set of update details, wherein the one or more data parameters related to the update details provides information to selectively filter the update data structure;

the computer system identifying a recipient account that is related to the first user account and the second user account and settings associated with the recipient account that include parameters defining an update feed for the recipient account;

the computer system using the update data structure to generate the update feed for the recipient account, the update feed including one or more update details and being generated by:

filtering the update data structure to identify entries that are likely to be of interest to the recipient account by comparing respective parameters of the first and the second entries with the settings associated with the recipient account, each of the identified entries including a reference to a location of a respective update detail of the one or more update details, and retrieving the one or more update details to include in the update feed by using respective references included in the identified entries, wherein at least a portion of the first set of update details and the second set of update details is excluded from the generated update feed based on the settings associated with the recipient account; and the computer system sending the update feed to the recipient account, wherein the first set of update details are stored separately from the update data structure.

2. The method of claim 1, wherein the first set of update details includes user-entered content received from a first user associated with the first user account, the user-entered content including an updated account entry from the first user; and wherein the first entry includes an indication of the first user account and a pointer to the stored first set of update details.

3. The method of claim 1, wherein the first set of update details includes an indication of a change in status of the first user account; and wherein the update data structure is usable by the computer system to store entries corresponding to user updates associated with any of a plurality of user accounts, and wherein the update data structure is usable by the computer system to generate update feeds for any of the plurality of user accounts.

4. The method of claim 1, further comprising:

the computer system determining to include at least a portion of the first set of update details in the feed in response to the first user account being identified by the first entry for the first set of updates.

5. The method of claim 1, wherein the recipient account is identified as a related user account in the first entry of the first set of updates and the second entry of the second set of updates;

wherein generating the update feed is performed asynchronously in response to the user accessing the recipient account; and wherein generating the update feed includes filtering the first entry and the second entry of the update data structure based on the settings associated with the recipient account.

6. The method of claim 1, further comprising:

the computer system generating a second update feed; and sending the second update feed to a second recipient account, wherein the update feed for the recipient account and the second update feed for the second recipient account are generated in combination by performing a shared filtering of the update data structure based on a combination of data from corresponding user accounts, wherein the shared filtering includes filtering entries of the update data structure based on information associated with the recipient account and information associated with the second recipient account.

7. The method of claim 1, further comprising:

the computer system storing a pre-specified number, N;

wherein generating the update feed includes determining a set of N most-recent entries for the recipient account.

8. The method of claim 1, wherein at least one of the first entry and the second entry in the update data structure includes an associated time value, and wherein at least one of the first entry and the second entry in the update data structure includes an associated time value that indicates a future time.

9. The method of claim 1, wherein said adding the first entry for the first set of updates to the update data structure is performed asynchronously in response to said storing the first set of update details.

10. The method of claim 1, wherein said adding the first entry for the first set of updates to the update data structure is performed synchronously as part of a batch process.

11. A system comprising:

one or more servers;

a storage subsystem; and a network interface, coupled to the one or more servers, configured to receive updates posted to a first user account and a second user account on a social network; and wherein the system is configured to:

identify a first set of updates posted to the first user account, the first set of updates including a first set of update details, the first set of update details comprising contents posted on the social network by a first user associated with the first user account;

request storing the first set of update details in a location associated with the first user account;

modify an update data structure by adding a first entry for the first set of updates to the update data structure, wherein the first entry includes a reference to the location where the first set of update details is stored, and includes one or more data parameters related to the first set of update details but does not include the first set of update details, wherein the one or more data parameters related to the update details provides information to selectively filter the update data structure;

identify a second set of updates posted to the second user account, the second set of updates including a second set of update details, the second set of update details comprising contents posted on the social network by a second user associated with the second user account;

request storing the second set of update details in a location associated with the second user account;

modify the update data structure by adding a second entry for the second set of updates to the update data structure, wherein the second entry includes a reference to the location where the second set of update details is stored, and includes one or more data parameters related to the first set of update details but does not include the second set of update details, wherein the one or more data parameters related to the update details provides information to selectively filter the update data structure;

identify a recipient account that is related to the first user account and the second user account and settings associated with the recipient account that include parameters defining an update feed for the recipient account;

generate the update feed that includes one or more update details, by:

filtering the update data structure to identify entries that are of interest to the recipient account by comparing respective parameters of the first and the second entries with the settings associated with the recipient account, each of the identified entries including a reference to a location of a respective update detail of the one or more update details, and retrieving the one or more update details to include in the update feed by using respective references included in the identified entries, wherein at least a portion of the first set of update details and the second set of update details is excluded from the generated updated feed based on the settings associated with the recipient account; and send the update feed to the recipient account, wherein the first set of update details are stored in the storage subsystem separately from the update data structure.

12. The system of claim 11, wherein the storage subsystem is coupled to the one or more servers, and wherein the system is further configured to store the update data structure in the storage subsystem.

13. The system of claim 11, further comprising a first storage system coupled to the one or more servers; and a second storage subsystem coupled to the one or more servers;

wherein the system is further configured to store the update data structure as a distributed database using at least the first and second storage subsystems.

14. The system of claim 11, wherein the system is configured to generate the update feed by filtering entries of the update data structure based on the settings associated with the recipient account; and wherein the first entry and the second entry include indications of associated user accounts, pointers to corresponding stored update details, and time values associated with corresponding user updates.

15. The system of claim 11, wherein the system is configured to modify the update data structure in response to the system receiving the first set of update details.

16. A non-transitory computer-readable medium having instructions stored thereon that, in response to execution by a computer system, cause the computer system to perform operations comprising:

receiving a first set of updates posted to a first user account on a social network, the first set of updates including a first set of update details, the first set of update details comprising contents posted by a first user associated with the first user account;

storing, for the first set of updates, the first set of update details in a location associated with the first user account;

adding a first entry for the first set of updates to an update date structure, wherein the first entry includes a reference to the location where the first set of update details is stored, and includes one or more data parameters related to the first set of update details without including the first set of update details, wherein the one or more data parameters related to the update details provides information to selectively filter the update data structure;

receiving a second set of updates posted to a second user account on the social network, the second set of updates including a second set of update details;

storing, for the second set of updates, the second set of update details in a location associated with the second user account, the second set of update details comprising contents posted by a second user associated with the second user account;

adding a second entry for the second set of updates to the update data structure, wherein the second entry includes a reference to the location where the second set of update details is stored, and includes one or more data parameters related to the second set of update details without including the second set of update details, wherein the one or more data parameters related to the update details provides information to selectively filter the update data structure;

identifying a recipient account that is related to the first user account and the second user account and settings associated with the recipient account that include parameters defining an update feed for the recipient account;

using the update data structure to generate the update feed that includes one or more update details, by:

filtering the update data structure to identify entries that are of interest to the recipient account by comparing respective parameters of the first and the second entries with the settings associated with the recipient account, each of the identified entries including a reference to a location of a respective update detail of the one or more update details, and retrieving the one or more update details to include in the update feed by using respective references included in the identified entries, wherein at least a portion of the first set of update details and second set of update details is excluded from the generated updated feed based on settings associated with the recipient account; and sending the update feed to the recipient account.

17. The non-transitory computer-readable medium of claim 16, wherein the first set of update details includes an indication of a request to associate the first user account with the recipient account.

18. The non-transitory computer-readable medium of claim 16, wherein the first set of update details includes an indication of a change in status of the first user account; and wherein the update data structure is usable by the computer system to store entries corresponding to user updates associated with any of a plurality of user accounts, and wherein the update data structure is usable by the computer system to generate update feeds for any of the plurality of user accounts.

19. The non-transitory computer-readable medium of claim 16, wherein the instructions stored thereon, in response to execution by the computer system, cause the computer system to perform operations further comprising:
generating a second update feed; and
sending the second update feed to a second recipient account, wherein the update feed for the recipient account and the second update feed for the second recipient account are generated in combination by performing a shared filtering of the update data structure based on a combination of data from corresponding user accounts, wherein the shared filtering includes filtering entries of the update data structure based on information associated with the recipient account and information associated with the second recipient account.

* * * * *